United States Patent
Pang et al.

(10) Patent No.: US 12,373,620 B2
(45) Date of Patent: Jul. 29, 2025

(54) METHOD AND SYSTEM FOR DESIGNING MAGNETIC RESONANCE IMAGING PERMANENT MAGNET, DEVICE, AND MEDIUM

(71) Applicant: Tiandatz Technology Co., Ltd, Tianjin (CN)

(72) Inventors: Yanwei Pang, Tianjin (CN); Yiming Liu, Tianjin (CN); Huawei Xia, Tianjin (CN); Yishun Guo, Tianjin (CN)

(73) Assignee: Tiandatz Technology Co., Ltd, Tianjin (CN)

( * ) Notice: Subject to any disclaimer, the term of this patent is extended or adjusted under 35 U.S.C. 154(b) by 0 days.

(21) Appl. No.: 18/544,262

(22) Filed: Dec. 18, 2023

(65) Prior Publication Data

US 2025/0045493 A1 Feb. 6, 2025

(30) Foreign Application Priority Data

Aug. 4, 2023 (CN) .......................... 202310974676.X

(51) Int. Cl.
*G06F 30/27* (2020.01)

(52) U.S. Cl.
CPC .................................. *G06F 30/27* (2020.01)

(58) Field of Classification Search
CPC ........... G06F 30/27; A61B 5/055; G06N 3/04; G01R 33/383
See application file for complete search history.

(56) References Cited

FOREIGN PATENT DOCUMENTS

| CN | 115455505 A | 12/2022 |
|---|---|---|
| CN | 115831570 A | 3/2023 |

OTHER PUBLICATIONS

Tewari, Sumit, Sahar Yousefi, and Andrew Webb. "Deep neural-network based optimization for the design of a multi-element surface magnet for MRI applications." Inverse problems 38.3 (2022): 035003. 11pages. (Year: 2022).*

(Continued)

*Primary Examiner* — Eunhee Kim
(74) *Attorney, Agent, or Firm* — Morgan, Lewis & Bockius LLP

(57) ABSTRACT

Disclosed is a method and system for designing a magnetic resonance imaging permanent magnet, a device, and a medium. The method includes: obtaining a target magnetic field map of a target magnetic block set, and the target magnetic block set is a set of target magnetic blocks corresponding to a number of target magnetic blocks determined based on a total mass of a set magnet; inputting the target magnetic field map into a parametric model to obtain a parameterized matrix, where the parameterized matrix includes a candidate spatial position number of each target magnetic block, spatial position coordinates of a center of each target magnetic block, an angle of each target magnetic block, and material distribution of each magnetic block, and the parametric model is constructed based on a deep neural network; and determining a three-dimensional spatial structure and material distribution of a permanent magnet based on the parameterized matrix.

7 Claims, 5 Drawing Sheets

(56) References Cited

OTHER PUBLICATIONS

Van Tai Nguyen, Steffen Bollmann, Michael Bermingham, Matthew S. Dargusch, Efficient modelling of permanent magnet field distribution for deep learning applications, Journal of Magnetism and Magnetic Materials, vol. 559, 2022, 169521, ISSN 0304-8853, 12 Pages. (Year: 2022).*

Pollok S, Bjørk R, Jørgensen PS. Inverse design of magnetic fields using deep learning. IEEE Transactions on Magnetics. May 20, 2021;57(7):1-4. (Year: 2021).*

Florio F, Sinha G, Sundararaman R. Designing high-accuracy permanent magnets for low-power magnetic resonance imaging. IEEE Transactions on Magnetics. Feb. 23, 2018;54(5):1-9. (Year: 2018).*

Tewari S, Yousefi S, Webb A. Deep neural-network based optimization for the design of a multi-element surface magnet for MRI applications. Inverse problems. Jan. 26, 2022;38(3):035003. (Year: 2022).*

First Office Action for Chinese Application No. 202310974676.X, dated Sep. 13, 2023, 11 pages including translation.

* cited by examiner

METHOD AND SYSTEM FOR DESIGNING MAGNETIC RESONANCE IMAGING PERMANENT MAGNET, DEVICE, AND MEDIUM

CROSS REFERENCE TO RELATED APPLICATION

This patent application claims the benefit and priority of Chinese Patent Application No. 202310974676.X, filed with the China National Intellectual Property Administration on Aug. 4, 2023, the disclosure of which is incorporated by reference herein in its entirety as part of the present application.

TECHNICAL FIELD

The present disclosure relates to the field of magnetic field intensities, and in particular, to a method and system for designing a magnetic resonance imaging (MRI) permanent magnet, a device, and a medium.

BACKGROUND

Compared with ultrasonic examination, computed tomography (CT), and other technologies, MRI is a unique medical imaging method, which features high contrast of soft tissue imaging, no ionizing radiation, and imaging in any plane, and is very important for diagnosis and treatment of various diseases.

Common magnetic resonance devices use a superconducting magnet to provide a main magnetic field, which has a high magnetic field intensity and good homogeneity. However, a superconducting magnetic resonance device needs a plurality of rooms to place an entire system and has very high purchase and maintenance costs. The superconducting magnet needs liquid helium for ultra-low temperature cooling. This medium has a high cost, and there is a risk of leakage. Because of its large size and weight generally greater than ten tons, the magnetic resonance device cannot support timely and on-site medical imaging, such as imaging of the wounded after natural disasters in the case of limited power and space, or diagnosis of the casualties in military field hospitals, and medical diagnosis in remote areas or rural areas. In addition, due to high costs, magnetic resonance devices cannot be popularized in community and rural hospitals.

A permanent magnet array makes it possible to develop a low-cost portable MRI device.

Compared with superconducting magnets, permanent magnets are generally made of neodymium iron boron, which is abundant in China, and thus has a low cost. In addition, the permanent magnets are significantly reduced in volume and mass compared with the superconducting magnets, and have better mobility. In addition, due to the low magnetic field, there is a very low risk of metal object ejection of the permanent magnets, and the permanent magnets are friendlier to patients with non-MRI compatible implants. However, due to the low magnetic field homogeneity, the imaging quality of permanent magnetic resonance devices is poor. Therefore, it is of great significance to study permanent magnets with high homogeneity to improve the imaging quality, and then improve utilization of such devices, so that magnetic resonance technology can be better popularized and people's health level can be improved.

In design, the permanent magnet is generally composed of a variety of magnetic blocks arranged in a certain order. No matter how the shape and material are chosen, an angle of a Halbach magnet is usually selected for arrangement, that is, the magnetic field angle in the same circumference changes continuously by $4x$. At present, a genetic algorithm is generally used in optimization design, but this algorithm is a continuous attempt to combine magnetic blocks, which cannot effectively explore a relationship between a magnetic field and magnetic block arrangement. In addition, a single magnetic block angle and magnetic block material type also limit the improvement of the magnetic field homogeneity. Therefore, although the genetic algorithm has achieved remarkable results in optimizing magnet design, there is still much room for improvement.

SUMMARY

An objective of the present disclosure is to provide a method and system for designing an MRI permanent magnet, a device, and a medium, which can improve a field intensity of a permanent magnet and optimize magnetic field homogeneity while providing a certain mass.

To achieve the above objective, the present disclosure provides the following solutions.

A method for designing an MRI permanent magnet includes:
  obtaining a target magnetic field map of a target magnetic block set, where the target magnetic field map is obtained by simulating an actual magnet constructed from the target magnetic block set and performing idealized approximate fitting based on a field map obtained by simulation, and the target magnetic block set is a set of target magnetic blocks corresponding to a number of target magnetic blocks determined based on a total mass of a set magnet;
  inputting the target magnetic field map into a parametric model to obtain a parameterized matrix, where the parameterized matrix includes a candidate spatial position number of each target magnetic block, spatial position coordinates of a center of each target magnetic block, an angle of each target magnetic block, and material distribution of each magnetic block, and the parametric model is constructed based on a deep neural network; and
  determining a three-dimensional spatial structure and material distribution of a permanent magnet based on the parameterized matrix.

Optionally, a method of determining the parametric model specifically includes:
  obtaining training data, where the training data includes a training magnetic field map and label data of a plurality of training magnetic block sets; the label data includes a training target fitting field map of training magnetic block sets; the training target fitting field map is obtained by fitting based on an average magnetic field intensity of the permanent magnet with a known three-dimensional spatial structure;
  constructing the deep neural network;
  inputting the training magnetic field map and the label data into the deep neural network, and training parameters of the deep neural network with an objective of minimizing a loss function, to obtain a trained deep neural network; and
  determining the trained deep neural network as the parametric model.

Optionally, the inputting the training magnetic field map and the label data into the deep neural network, and training parameters of the deep neural network with an objective of minimizing a loss function, to obtain a trained deep neural network specifically includes:
  obtaining a training initial parameterized matrix of the training magnetic field map and a label parameterized matrix of the label data; and
  training the parameters of the deep neural network to obtain the trained deep neural network with an objective of minimizing a difference between the training initial parameterized matrix and the label parameterized matrix.

Optionally, the obtaining a target magnetic field map of a target magnetic block set specifically includes:
  constructing a full-degrees-of-freedom magnet geometric model, wherein magnetic blocks in the full-degrees-of-freedom magnet geometric model have freedom in position arrangement, rotation direction, position selection, and material selection;
  determining the number of the target magnetic blocks based on the total mass of the set magnet;
  randomly initializing and selecting target magnetic blocks in the geometric model based on the number of the target magnetic blocks, and determining a target magnetic block set;
  simulating any target magnetic block by using a finite element analysis method to obtain a magnetic field map corresponding to the target magnetic block;
  superimposing all magnetic field maps by using a linear superposition method to obtain an initial magnetic field map; and
  calculating an average magnetic field intensity of the initial magnetic field map, and fitting an ideal magnetic field based on the average magnetic field intensity to obtain the target magnetic field map.

A system for designing an MRI permanent magnet includes:
  an acquisition module, configured to obtain a target magnetic field map of a target magnetic block set, where the target magnetic field map is obtained by simulating an actual magnet constructed from the target magnetic block set and performing idealized approximate fitting based on a field map obtained by simulation, and the target magnetic block set is a set of target magnetic blocks corresponding to a number of target magnetic blocks determined based on a total mass of a set magnet;
  an output module, configured to input the target magnetic field map into a parametric model to obtain a parameterized matrix, where the parameterized matrix includes a candidate spatial position number of each target magnetic block, spatial position coordinates of a center of each target magnetic block, an angle of each target magnetic block, and material distribution of each magnetic block, and the parametric model is constructed based on a deep neural network; and
  a determining module, configured to determine a three-dimensional spatial structure and material distribution of a permanent magnet based on the parameterized matrix.

An electronic device includes a memory and a processor, where the memory is configured to store a computer program, and the processor runs the computer program to enable the electronic device to perform the method for designing an MRI permanent magnet described above.

A computer-readable storage medium is provided, where a computer program is stored on the computer-readable storage medium, and when the computer program is executed by a processor, the method for designing an MRI permanent magnet described above is implemented.

According to specific embodiments of the present disclosure, the present disclosure has the following technical effects:

The present disclosure provides a method and system for designing an MRI permanent magnet, a device, and a medium. A target magnetic field map is obtained by simulating an actual magnet constructed from a target magnetic block set and performing idealized approximate fitting based on a field map obtained by simulation, and the target magnetic block set is a set of target magnetic blocks corresponding to a number of target magnetic blocks determined based on a total mass of a set magnet; the target magnetic field map is input into a parametric model to obtain a parameterized matrix, where the parameterized matrix includes a candidate spatial position number of each target magnetic block, spatial position coordinates of a center of each target magnetic block, an angle of each target magnetic block, and material distribution of each magnetic block; and a three-dimensional spatial structure of a permanent magnet is determined based on the parameterized matrix. Because the parametric model is built based on the deep neural network, according to the present disclosure, a field intensity of the permanent magnet can be improved, and magnetic field homogeneity can be optimized while a certain mass is provided.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

DESCRIPTION OF REFERENCE SIGNS

Acquisition module—1, output module—2, determining module—3.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by those skilled in the art based on the embodiments of the present disclosure without creative efforts shall fall within the protection scope of the present disclosure.

An objective of the present disclosure is to provide a method and system for designing an MRI permanent magnet, a device, and a medium, which can improve a field intensity of a permanent magnet and optimize magnetic field homogeneity while providing a certain mass.

In order to make the above objective, features and advantages of the present disclosure clearer and more comprehensible, the present disclosure will be further described in detail below in combination with accompanying drawings and specific implementations.

Embodiment 1

Figure 1:
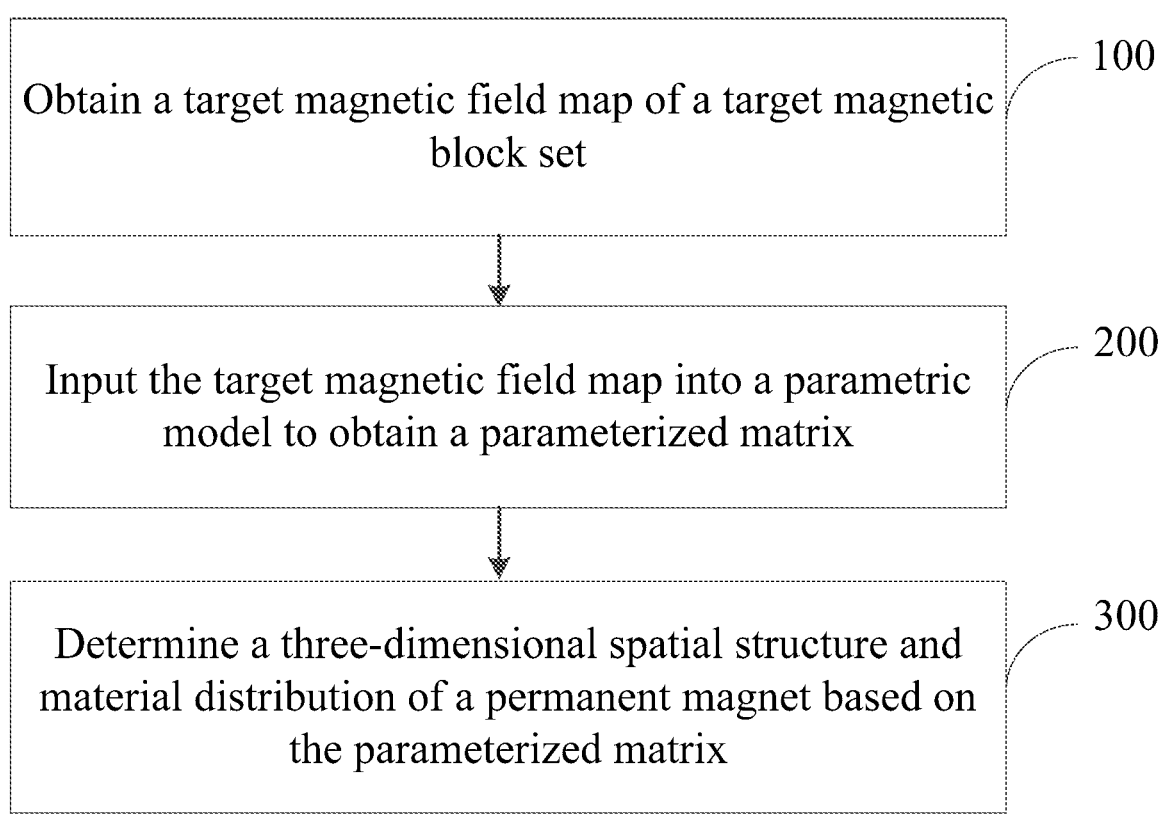
FIG. 1 is a flowchart of a method for designing an MRI permanent magnet according to an embodiment of the present disclosure.

As shown in FIG. 1, an embodiment of the present disclosure provides a method for designing an MRI permanent magnet, including the following steps.

Step 100: Obtain a target magnetic field map of a target magnetic block set, where the target magnetic field map is obtained by simulating an actual magnet constructed from the target magnetic block set and performing idealized approximate fitting based on a field map obtained by simulation, and the target magnetic block set is a set of target magnetic blocks corresponding to a number of target magnetic blocks determined based on a total mass of a set magnet.

The obtaining a target magnetic field map of a target magnetic block set specifically includes:
constructing a full-degrees-of-freedom magnet geometric model, wherein magnetic blocks in the full-degrees-of-freedom magnet geometric model have freedom in position arrangement, rotation direction, position selection, and material selection;
determining the number of the target magnetic blocks based on the total mass of the set magnet;
randomly initializing and selecting target magnetic blocks in the geometric model based on the number of the target magnetic blocks, and determining a target magnetic block set;
simulating any target magnetic block by using a finite element analysis method to obtain a magnetic field map corresponding to the target magnetic block;
superimposing all magnetic field maps by using a linear superposition method to obtain an initial magnetic field map; and
calculating an average magnetic field intensity of the initial magnetic field map, and fitting an ideal magnetic field based on the average magnetic field intensity to obtain an ideal uniform magnetic field map, i.e., the target magnetic field map.

Step 200: Input the target magnetic field map into a parametric model to obtain a parameterized matrix, where the parameterized matrix includes a candidate spatial position number of each target magnetic block, spatial position coordinates of a center of each target magnetic block, an angle of each target magnetic block, and material distribution of each magnetic block, and the parametric model is constructed based on a deep neural network.

Step 300: Determine a three-dimensional spatial structure and material distribution of a permanent magnet based on the parameterized matrix.

A method of determining the parametric model specifically includes:

obtaining training data, where the training data includes a training magnetic field map and label data of a plurality of training magnetic block sets; the label data includes a training target fitting field map of training magnetic block sets; the training target fitting field map is obtained by fitting based on an average magnetic field intensity of the permanent magnet with a known three-dimensional spatial structure;
constructing the deep neural network; and
inputting the training magnetic field map and the label data into the deep neural network, and training parameters of the deep neural network with an objective of minimizing a loss function, to obtain a trained deep neural network.

The inputting the training magnetic field map and the label data into the deep neural network, and training parameters of the deep neural network with an objective of minimizing a loss function, to obtain a trained deep neural network specifically includes:
obtaining a training initial parameterized matrix of the training magnetic field map and a label parameterized matrix of the label data; and
training the parameters of the deep neural network to obtain the trained deep neural network with an objective of minimizing a difference between the training initial parameterized matrix and the label parameterized matrix.

The trained deep neural network is determined as the parametric model.

Figure 2:
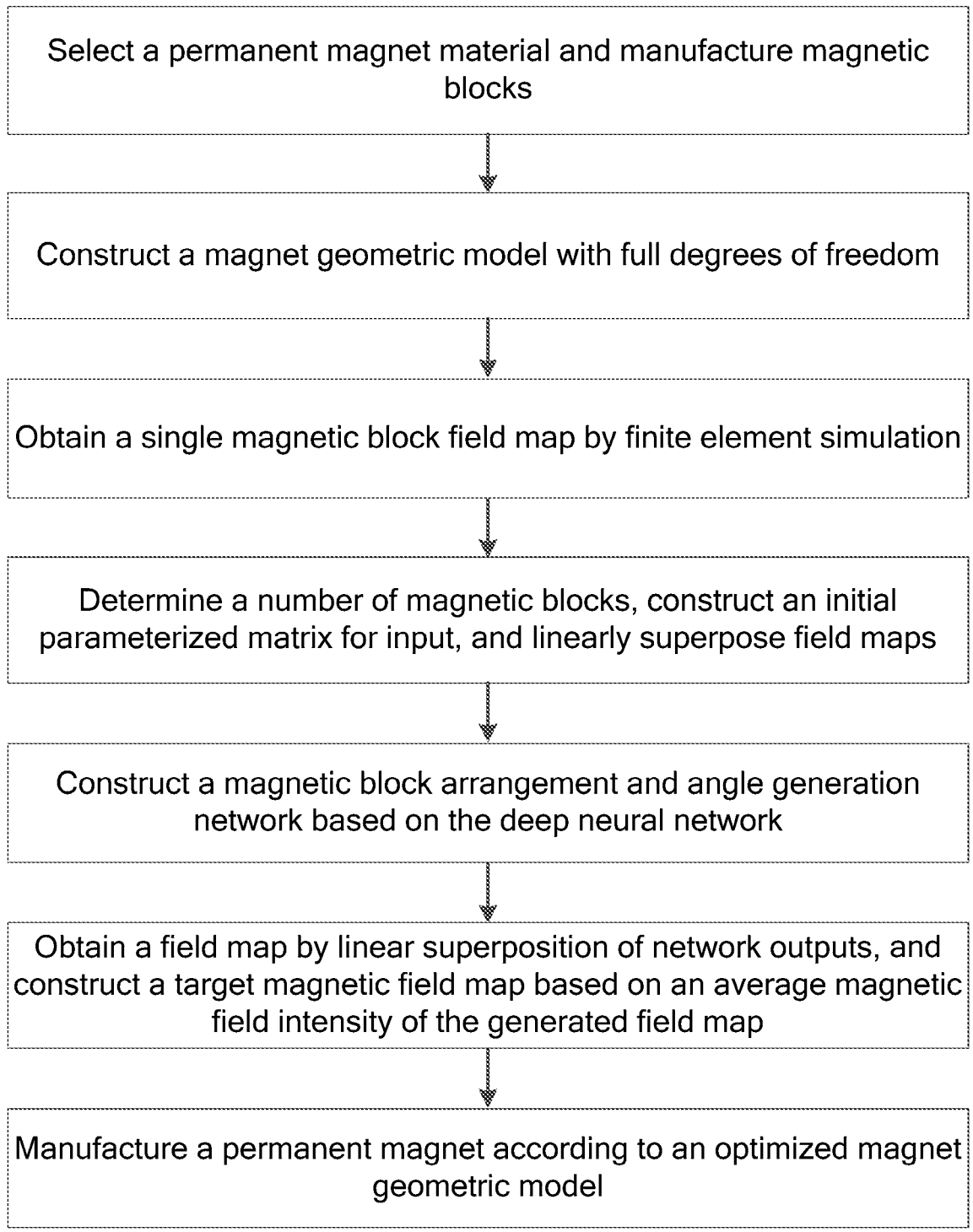
FIG. 2 is a flowchart of a method for designing an MRI permanent magnet in an actual application according to an embodiment of the present disclosure.

In an actual application, as shown in FIG. 2, the method includes the following specific operation steps.
Step 1: Select a Permanent Magnet Material and Manufacture Magnetic Blocks.

Specifically, the permanent magnet material is selected based on comprehensive consideration of factors such as magnetic energy product, remanence, coercivity, density, and temperature stability, and cubic magnetic blocks with a specific volume are manufactured according to actual needs.

In this embodiment, the permanent magnet material is selected based on comprehensive consideration of factors such as magnetic energy product, remanence, coercivity, density, and temperature stability, and cubic magnetic blocks with a specific volume, such as neodymium iron boron N54 cubic magnets with a volume of 1 cubic inch, are manufactured according to actual needs.
Step 2: Construct a Full-Degrees-of-Freedom Magnet Geometric Model.

Figure 3:
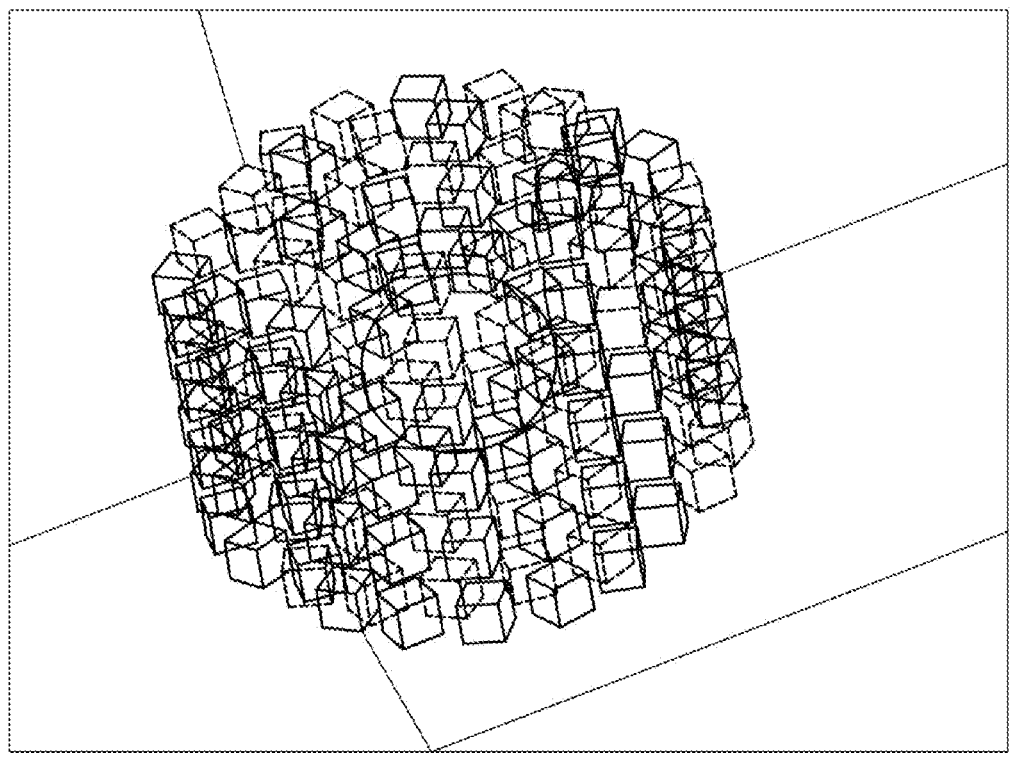
FIG. 3 is a schematic diagram of a full-degrees-of-freedom magnet geometric model based on deep learning according to an embodiment of the present disclosure.

Specifically, the full-degrees-of-freedom magnet geometric model is constructed. The full-degrees-of-freedom means that position selection and arrangement of magnetic blocks in the model are free and the magnetic blocks have a free rotation angle; and a total number of rows, a number of columns and a number of layers of the magnetic blocks included in the magnet geometric model are set in advance according to design needs. A schematic diagram of the magnet geometric model is shown in FIG. 3.

In this example, the positions and angles of the magnetic blocks are free, and a number of columns and a number of layers of magnets are preset. Herein "row" refers to magnetic blocks annularly arranged in an axial direction of magnets, "column" refers to magnetic blocks arranged in parallel in the axial direction, and cylindrical magnetic blocks arranged in the same radius are collectively referred to as a "layer." Specific parameters of the model in this example are as follows: A first layer L1 includes 6 rows and 14 columns, and a second layer L2 includes 4 rows and 20 columns.

Step 3: Obtain a Magnetic Field Map Generated by Each Single Magnetic Block by Simulation Based on the Full-Degrees-of-Freedom Magnet Geometric Model Constructed in Step 2.

Specifically, a method based on finite element analysis is used to simulate a three-dimensional magnetic field map generated by each single magnetic block in the full-degrees-of-freedom magnet geometric model in a specific imaging area.

In this example, the method based on finite element analysis is used for magnetic field simulation. The rotation direction of each magnetic block includes clockwise, Halbach and counterclockwise of x, y and z coordinate axes, and the amplitude is set to a required angle (taking 1° as an example), with 3 angles in each direction. Each magnetic block has 27 angles in total. Magnetic field points extracted from the field map are defined as 1,030,301 (101×101×101) points uniformly selected in a magnetic resonance field of view (FOV).

Step 4: Determine a Number of Required Magnetic Blocks Based on a Total Mass of a Target Magnet, Construct an Initial Parameterized Matrix for Input, and Linearly Superpose Based on the Initial Parameterized Matrix to Obtain a Field Map Input.

Step 4 specifically includes the following substeps.

Substep (1): Determine a total mass of a permanent magnet based on a field intensity, mobility and other factors, and calculate the number of the required magnetic blocks with reference to the mass of a single magnetic block; randomly select this number of magnetic blocks in the magnet geometric model, and initialize to a Halbach angle.

The total mass of the permanent magnet is specifically designed for a specific task according to design requirements, a bearing capacity of a building, whether the permanent magnet can be moved, and whether there is a requirement for vehicle-mounted, and is not fixed.

The design requirements cover the field intensity index. The number of magnetic blocks can be inferred according to an average magnetic field generated by each magnetic block in a target area, and then the total mass can be calculated.

Substep (2): Select the position of the magnetic block in the magnet geometric model as binary values of 0, 1, which correspond to yes and no, set the movement of the spatial position of the magnetic block according to relative spatial displacement on the designed magnet geometric model, set according to x, y and z coordinate axes, and set the amplitude of translation along each axis as required, where there is continuous value distribution. The angle is set according to a degree of freedom of rotation, that is, the rotation direction of the angle is set to a positive value, a negative value and a zero value according to the x, y and z coordinate axes, which correspond to a constant angle, clockwise rotation and counterclockwise rotation respectively. The rotation amplitude is set as required, and there is a continuous range of the selected rotation amplitude. The material selection of the magnetic block is continuous, that is, the materials are continuously selected within the range of available magnetic block materials.

Substep (3): Merge the above parameters of the magnet geometric model into a parameterized matrix, and linearly superpose the field maps of the selected magnetic blocks according to the parameterized matrix to obtain a training magnetic field map of the permanent magnet structure.

In this example, the total mass of magnets w=9.8 kg. According to this index, the total number of magnetic blocks is set to 80. The parameterized matrix includes a position matrix and an angle matrix, and corresponding shapes are set to the position matrix and the angle matrix [164×3].

The linear superposition method is verified to be consistent with a magnetic field result of overall finite element simulation after the combination of selected magnetic blocks, and may be used as an input.

Step 5: Construct a Magnetic Block Arrangement and Angle Generation Network Based on the Deep Neural Network.

A specific method of step 5 includes:
selecting the magnetic block arrangement and angle generation network to extract information such as position selection, position arrangement, angle and material in the training magnetic field map, and outputting a training parameterized matrix corresponding to the training magnetic field map, that is, label data.

In this example, the magnetic block arrangement and angle generation network based on the deep neural network is constructed. The input of the network is information of a three-dimensional initial magnetic field map of 101×101×101, and an initial magnetic field map matrix is input into two-layer three-dimensional convolution modules. Each module includes a three-dimensional convolution layer, a max pooling layer and a batch normalization layer. Outputs are the position matrix and the angle matrix, that is, the label data is obtained.

Step 6: Obtain a Field Map by Linear Superposition of Outputs, and Construct a Target Magnetic Field Map Based on an Average Magnetic Field Intensity of the Generated Field Map.

Step 6 specifically includes the following substeps.

Substep (1): Calculate and read a magnetic block field map of each specified position, angle and material according to the parameterized matrix output by the magnetic block arrangement and angle generation network, and linearly superimpose the read magnetic block field maps to obtain a magnetic field map of a permanent magnet.

Substep (2): Obtain a relatively uniform target magnetic field map by means of statistical characteristics of the field map.

By calculating an average value of the field map, the average value is mapped and then a relatively uniform target magnetic field map is fitted.

In this example, the field map is read according to the position matrix and the angle matrix output in step 5, the field map corresponding to an output parameterized matrix is obtained after linear superposition, an average value of the field map is calculated to obtain an average magnetic field intensity $B_{mean}$, and a target magnetic field map with ideal uniformity is obtained by multiplying $B_{mean}$ with an all-one matrix of 101×101×101.

Step 7: Input the Target Magnetic Field Map into the Network, and Iterate to Obtain a Selected Optimal Magnetic Block Position, Spatial Position, Angle and Material, that is, Obtain a Parameterized Matrix.

Figure 4:
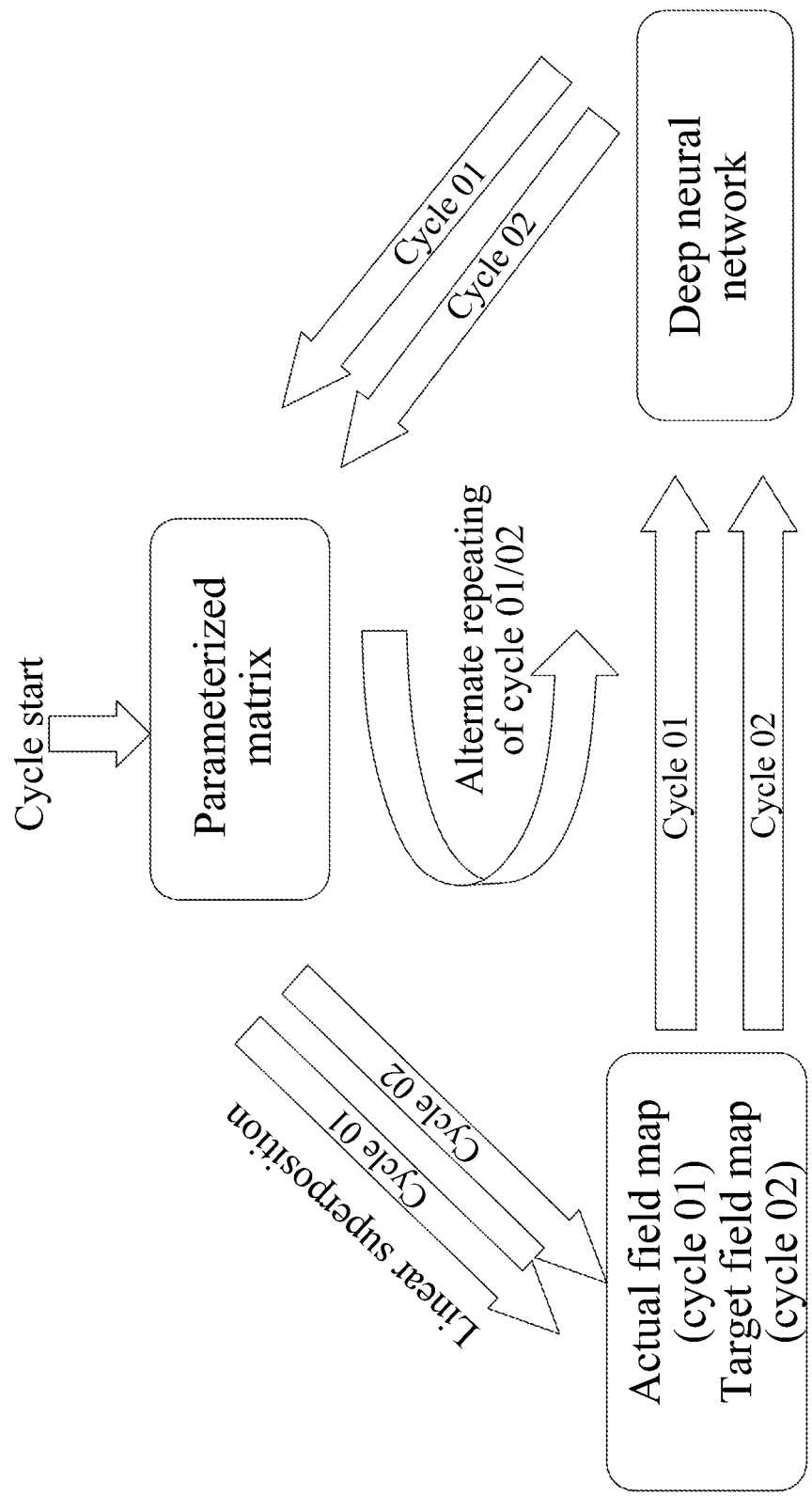
FIG. 4 is a frame diagram of a permanent magnet design algorithm according to an embodiment of the present disclosure.

As shown in FIG. 4, a specific method of step 7 includes:
inputting the target magnetic field map into the deep neural network to obtain a parameterized matrix output corresponding to the target magnetic field map, calculating a difference between parameterized matrices of target field and actual field outputs as a loss function of the network, and performing iterative training to obtain a convergent model.

In this example, the target magnetic field map obtained in step 6 is input into the neural network in step 5 to obtain the output parameterized matrix. An L1 loss between the output parameterized matrix and the parameterized matrix in step 5, that is, label data, is calculated as the loss function of the network, and steps 5 and 6 are repeatedly performed until the model converges.

According to the flow of FIG. 4, the training process may be alternatively as follows:

The overall initial input is the specified parameterized matrix. In a first cycle, an actual field map is obtained by linear superposition calculation, and is used as an input of the deep neural network, and the output parameterized matrix is used as an input of a second cycle. The uniform target field is fitted according to the average field intensity obtained by linear superposition, and the target field map is obtained and sent to the deep neural network. The two cycles are alternately repeated to form an overall design framework based on deep learning.

Step 8: Manufacture a Permanent Magnet According to an Optimized Magnet Geometric Model.

A specific method of step 8 includes:
generating the target magnetic field map by using an average field intensity in performance indexes, inputting the target magnetic field map into the model to obtain a geometric model of the permanent magnet with optimal performance, and manufacturing a main magnet according to the optimized magnet geometric model.

In this example, according to the requirement of designing a target average field intensity of 80 mT and the calculated target magnetic field map in step 6, the target magnetic field map is input into the model trained in step 7 to obtain the output parameterized matrix, and the selected position, spatial position, angle and material of magnetic blocks are obtained according to the parameterized matrix, and can be regarded as the optimal permanent magnet volume and model design, and the main magnet can be manufactured according to the model.

Experimental results in Table 1 show that the method for designing a permanent magnet based on deep learning has achieved certain performance improvement compared with equally spaced sampling and a genetic algorithm.

TABLE 1

Performance comparison between an algorithm for designing a permanent magnet based on deep learning and other algorithms.

| Algorithm type | Uniformity (ppm) |
| --- | --- |
| Halbach equally spaced sampling | $4.5 \times 10^5$ |
| Genetic algorithm | $2.5603 \times 10^5$ |
| Deep learning | $1.4092 \times 10^5$ |

Embodiment 2

Figure 5:
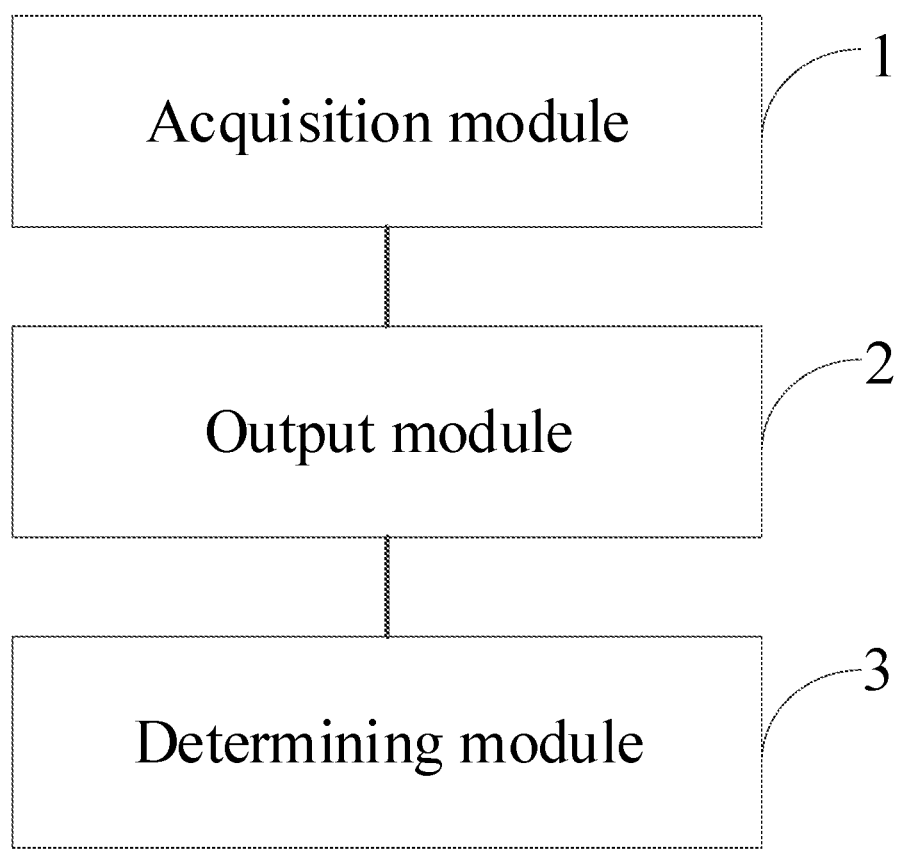
FIG. 5 is a structural diagram of a system for designing an MRI permanent magnet according to an embodiment of the present disclosure.

As shown in FIG. 5, an embodiment of the present disclosure provides a system for designing an MRI permanent magnet. The system includes an acquisition module 1, an output module 2, and a determining module 3.

The acquisition module 1 is configured to obtain a target magnetic field map of a target magnetic block set, where the target magnetic field map is obtained by simulating an actual magnet constructed from the target magnetic block set and performing idealized approximate fitting based on a field map obtained by simulation, and the target magnetic block set is a set of target magnetic blocks corresponding to a number of target magnetic blocks determined based on a total mass of a set magnet.

The output module 2 is configured to input the target magnetic field map into a parametric model to obtain a parameterized matrix, where the parameterized matrix includes a candidate spatial position number of each target magnetic block, spatial position coordinates of a center of each target magnetic block, an angle of each target magnetic block, and material distribution of each magnetic block, and the parametric model is constructed based on a deep neural network.

The determining module 3 is configured to determine a three-dimensional spatial structure and material distribution of a permanent magnet based on the parameterized matrix.

Embodiment 3

An embodiment of the present disclosure provides an electronic device, including a memory and a processor, where the memory is configured to store a computer program, and the processor runs the computer program to enable the electronic device to perform the method for designing an MRI permanent magnet in Embodiment 1.

As an optional implementation, the present disclosure further provides a computer-readable storage medium, where a computer program is stored on the computer-readable storage medium, and when the computer program is executed by a processor, the method for designing an MRI permanent magnet in Embodiment 1 is implemented.

The present disclosure has the following advantages and beneficial effects:

1. The present disclosure provides a method for designing an MRI permanent magnet. Compared with the conventional random trial and error by using a combination of magnetic blocks and the genetic algorithm, deep learning can extract characteristics of magnetic field, and the interaction of magnetic fields between magnetic blocks and the influence of a single magnetic block on the total magnetic field are modeled, thereby better exploring a relationship between magnetic block arrangement and magnetic fields.

2. The magnet geometric model constructed according to the present disclosure breaks through the limitation of a conventional Halbach magnet, features free positions and rotation directions of magnetic blocks, and has a larger optimization space compared with the conventional design, and there is a high design upper limit of the performance of the permanent magnet.

3. Compared with the conventional algorithm, the deep neural network used in the present disclosure can better process spatial information including complex positions, angles of full degrees of freedom and fully continuous magnetic block materials, and can still extract characteristic information of a magnetic field efficiently and accurately when the total number of magnetic blocks in the magnet geometric model increases exponentially.

4. The model trained based on the deep neural network according to the present disclosure has the ability to fit the magnetic block position and arrangement according to a real magnetic field, has high mobility, and is suitable for permanent magnet design under various target magnetic fields.

Embodiments of the description are described in a progressive manner, each embodiment focuses on the difference from other embodiments, and for the same and similar parts between the embodiments, reference may be made to each other. Since the system disclosed in an embodiment corresponds to the method disclosed in an embodiment, the description is relatively simple, and for related contents, reference may be made to the description of the method.

Particular examples are used herein for illustration of principles and implementations of the present disclosure. The descriptions of the above embodiments are merely used for assisting in understanding the method of the present disclosure and its core ideas. In addition, those of ordinary skill in the art can make various modifications in terms of specific implementations and the scope of application in accordance with the ideas of the present disclosure. In conclusion, the content of the description shall not be construed as limitations to the present disclosure.

What is claimed is:

1. A method for designing a magnetic resonance imaging (MRI) permanent magnet, comprising:
obtaining a target magnetic field map of a target magnetic block set, wherein the target magnetic field map is obtained by simulating an actual magnet constructed from the target magnetic block set and performing idealized approximate fitting based on a field map obtained by simulation, and the target magnetic block set is a set of target magnetic blocks corresponding to a number of target magnetic blocks determined based on a total mass of a set magnet;
inputting the target magnetic field map into a parametric model to obtain a parameterized matrix, wherein the parameterized matrix comprises a candidate spatial position number of each target magnetic block, spatial position coordinates of a center of each target magnetic block, an angle of each target magnetic block, and material distribution of each magnetic block, and the parametric model is constructed based on a deep neural network; and
determining a three-dimensional spatial structure and material distribution of a permanent magnet based on the parameterized matrix;
wherein a method of determining the parametric model comprises:
obtaining training data, wherein the training data comprises a training magnetic field map and label data of a plurality of training magnetic block sets; the label data comprises a training target fitting field map of training magnetic block sets; the training target fitting field map is obtained by fitting based on an average magnetic field intensity of the permanent magnet with a known three-dimensional spatial structure;
constructing the deep neural network;
inputting the training magnetic field map and the label data into the deep neural network, and training parameters of the deep neural network with an objective of minimizing a loss function, to obtain a trained deep neural network; and
determining the trained deep neural network as the parametric model;
wherein the inputting the training magnetic field map and the label data into the deep neural network, and training parameters of the deep neural network with an objective of minimizing a loss function, to obtain a trained deep neural network comprises:
obtaining a training initial parameterized matrix of the training magnetic field map and a label parameterized matrix of the label data; and
training the parameters of the deep neural network to obtain the trained deep neural network with an objective of minimizing a difference between the training initial parameterized matrix and the label parameterized matrix.

2. The method for designing an MRI permanent magnet according to claim 1, wherein the obtaining a target magnetic field map of a target magnetic block set comprises:
constructing a magnet geometric model;
determining the number of the target magnetic blocks based on the total mass of the set magnet;
randomly initializing and selecting target magnetic blocks in the geometric model based on the number of the target magnetic blocks, and determining a target magnetic block set;
simulating any target magnetic block by using a finite element analysis method to obtain a magnetic field map corresponding to the target magnetic block;
superimposing all magnetic field maps by using a linear superposition method to obtain an initial magnetic field map; and
calculating an average magnetic field intensity of the initial magnetic field map, and fitting an ideal magnetic field based on the average magnetic field intensity to obtain the target magnetic field map.

3. An electronic device comprising a memory and a processor, wherein the memory is configured to store a computer program, and the processor runs the computer program to enable the electronic device to perform the method for designing an MRI permanent magnet according to claim 1.

4. A computer-readable storage medium, wherein a computer program is stored on the computer-readable storage medium, and when the computer program is executed by a processor, the method for designing an MRI permanent magnet according to claim 1 is implemented.

5. An electronic device, comprising a memory and a processor, wherein the memory is configured to store a computer program, and the processor runs the computer program to enable the electronic device to perform the method for designing an MRI permanent magnet according to claim 1.

6. A computer-readable storage medium, wherein a computer program is stored on the computer-readable storage medium, and when the computer program is executed by a processor, the method for designing an MRI permanent magnet according to claim 1 is implemented.

7. A system for designing an MRI permanent magnet, comprising:
an acquisition module, configured to obtain a target magnetic field map of a target magnetic block set, wherein the target magnetic field map is obtained by simulating an actual magnet constructed from the target magnetic block set and performing idealized approximate fitting based on a field map obtained by simulation, and the target magnetic block set is a set of target magnetic blocks corresponding to a number of target magnetic blocks determined based on a total mass of a set magnet;
an output module, configured to input the target magnetic field map into a parametric model to obtain a parameterized matrix, wherein the parameterized matrix comprises a candidate spatial position number of each target magnetic block, spatial position coordinates of a center of each target magnetic block, an angle of each target magnetic block, and material distribution of each magnetic block, and the parametric model is constructed based on a deep neural network; and a determining module, configured to determine a three-dimensional spatial structure and material distribution of a permanent magnet based on the parameterized matrix;

wherein a method of determining the parametric model specifically-comprises:

obtaining training data, wherein the training data comprises a training magnetic field map and label data of a plurality of training magnetic block sets; the label data comprises a training target fitting field map of training magnetic block sets; the training target fitting field map is obtained by fitting based on an average magnetic field intensity of the permanent magnet with a known three-dimensional spatial structure;

constructing the deep neural network;

inputting the training magnetic field map and the label data into the deep neural network, and training parameters of the deep neural network with an objective of minimizing a loss function, to obtain a trained deep neural network; and determining the trained deep neural network as the parametric model;

wherein the inputting the training magnetic field map and the label data into the deep neural network, and training parameters of the deep neural network with an objective of minimizing a loss function, to obtain a trained deep neural network comprises:

obtaining a training initial parameterized matrix of the training magnetic field map and a label parameterized matrix of the label data; and training the parameters of the deep neural network to obtain the trained deep neural network with an objective of minimizing a difference between the training initial parameterized matrix and the label parameterized matrix.

* * * * *